US012699376B2

(12) United States Patent  (10) Patent No.: US 12,699,376 B2
Mysore et al.  (45) Date of Patent: Aug. 4, 2026

(54) SUBDIVISION-BASED SURFACE EDITOR

(71) Applicant: Siemens Industry Software Inc.,
Plano, TX (US)

(72) Inventors: Vadiraj Mysore, Madison, AL (US);
Jeffrey A. Walker, Huntsville, AL (US)

(73) Assignee: Siemens Industry Software Inc.,
Plano, TX (US)

( * ) Notice: Subject to any disclaimer, the term of this
patent is extended or adjusted under 35
U.S.C. 154(b) by 467 days.

(21) Appl. No.: 18/040,204

(22) PCT Filed: Aug. 20, 2020

(86) PCT No.: PCT/US2020/047096
§ 371 (c)(1),
(2) Date: Feb. 1, 2023

(87) PCT Pub. No.: WO2022/039740
PCT Pub. Date: Feb. 24, 2022

(65) Prior Publication Data
US 2023/0305526 A1 Sep. 28, 2023

(51) Int. Cl.
B33Y 50/02 (2015.01)
G05B 19/4099 (2006.01)
G06T 19/20 (2011.01)
(52) U.S. Cl.
CPC .......... G05B 19/4099 (2013.01); B33Y 50/02
(2014.12); G06T 19/20 (2013.01);
(Continued)

(58) Field of Classification Search
CPC ...... G05B 19/4099; G05B 2219/35134; B33Y
50/02; G06T 19/20; G06T 2219/2021;
(Continued)

(56) References Cited

U.S. PATENT DOCUMENTS 11,694,002 B1 * 7/2023 Bulleit ............... A41D 13/0002
703/2
2003/0197701 A1 * 10/2003 Teodosiadis ............ G06T 17/30
345/420
(Continued)

OTHER PUBLICATIONS

Bronsvoort, W.F., van Nieuwenhuizen, P.R. and Post, F.H., 1989.
Display of profiled sweep objects. The Visual Computer, 5, pp.
147-157. (Year: 1989).*
(Continued)

*Primary Examiner* — Alicia M. Choi

(57) ABSTRACT

Surface editing is performed in typical computer-aided
design (CAD) software products by using special tools to
edit special surfaces, such as b-splines or subdivision sur-
faces. It is recognized herein that current approaches to
editing surfaces are not generally applicable. For example,
common CAD and surface modeling software products are
tailored to a specific surface type or vendor specific format,
or otherwise are not generally applicable to given analytical
and non-analytical surfaces. In various embodiments
described herein, subdivision surfaces can be generated to
represent any surface. Further, surfaces can be manipulated
using a control cage associated with the subdivision surface.

18 Claims, 10 Drawing Sheets

(52) U.S. Cl.
CPC ............... *G05B 2219/35134* (2013.01); *G06T 2219/2021* (2013.01)

(58) Field of Classification Search
CPC ......... G06T 17/20; G06T 17/30; G06T 13/80; G06T 11/203; G06F 2113/10; G06F 30/10
See application file for complete search history.

(56) References Cited

U.S. PATENT DOCUMENTS

| | | | | |
|---|---|---|---|---|
| 2005/0168463 | A1 | 8/2005 | Seulveda | |
| 2007/0229544 | A1* | 10/2007 | Chai | G06T 17/30 345/647 |
| 2008/0225043 | A1* | 9/2008 | Rosel | G06T 17/30 345/420 |
| 2009/0060299 | A1* | 3/2009 | Hibbard | G06T 17/30 382/128 |
| 2009/0238404 | A1* | 9/2009 | Orderud | G06T 7/149 382/103 |
| 2010/0214312 | A1* | 8/2010 | Weber | G06T 13/80 345/647 |
| 2011/0041641 | A1* | 2/2011 | Bennett | A63H 3/04 74/490.08 |
| 2014/0192051 | A1 | 7/2014 | Meiri | |
| 2024/0184934 | A1* | 6/2024 | Lupas | G06F 30/12 |

OTHER PUBLICATIONS

Rossignac, J.R., 1987, January. Constraints in constructive solid geometry. In Proceedings of the 1986 workshop on Interactive 3D graphics (pp. 93-110). (Year: 1987).*

Crozet, S., 2017. Efficient contact determination between solids with boundary representations (B-Rep) (Doctoral dissertation, Université Grenoble Alpes). (Year: 2017).*

Anonymous: "B-spline—Wikipedia"; Jul. 11, 2020 (Jul. 11, 2020); XP055801535; Retrieved from the Internet: URL: https://en.wikipedia.org/w/index.php?title=B-spline&oldid=967159979.

Simply Rhino 3D Tutorials and Events: "An Introduction to SubD (Subdivision Surface Modeling) in Rhino3d 7"; Jan. 20, 2020 (Jan. 28, 2020); XP054981765; Retrieved from the Internet: URL: https://www.youtube.com/watch?v=RlbsNurVdb0.

IIT DC 2016: "Rhino Basics Sweep 1 and Sweep 2"; Youtube; Oct. 13, 2016 (Oct. 13, 2016); p. 1pp.; XP054981772; Retrieved from the Internet: URL: https://www.youtube.com/watch?v=HhShLON25pk.

Cverkovi Dusan :"Spiraling Observation Tower: Creating Iconic Rhino Structures", https://howtorhino.com/rhino-grasshopper-tutorials/spiraling-observation-tower/, Apr. 16, 2019.

Wang Shuting et al.:" Mechanical CAD technology ", China University of Science and Technology Press, p. 70-83, Sep. 30, 2012.

* cited by examiner

SUBDIVISION-BASED SURFACE EDITOR

BACKGROUND

Current systems, for instance computer-aided (CAD) design software products, can be used to edit the topology or surfaces of models that represent three-dimensional (3D) objects. The topology of a model or object refers to the boundary of the object (solid) or a surface of the object. The topology of a solid or surface is normally organized hierarchically as faces, edges, vertices (F/E/Vs). For example, a cube has six faces, each face having four edges. The edges in turn are bound by vertices. The faces are sewn together along the common edges. Each face has an underlying surface geometry. Similarly, edges can have curves as underlying geometry. The underlying geometry can be infinite, semi-infinite, or bounded. A face is a bounded portion of the underlying geometry.

Surface editing is performed in typical computer-aided design (CAD) software products by using special tools to edit special surfaces, such as analytic surfaces, b-splines or subdivision surfaces. It is recognized herein that current approaches to editing surfaces are not generally applicable. For example, common CAD and surface modeling software products are tailored to a specific surface type or vendor specific format, or otherwise are not generally applicable to given analytical and non-analytical surfaces.

BRIEF SUMMARY

Embodiments of the invention address and overcome one or more of the described-herein shortcomings by providing universal methods, systems, and apparatuses that can efficiently generate models or designs with various types of editable surfaces.

In an example aspect, a computing system can be configured to obtain or display a model of an object. The model can define one or more faces having one or more surfaces. The computing system can be further configured to generating an approximation, for instance a uniform bi-cubic, b-spline approximation, associated with a specific surface of the one or more surfaces. Based on the approximation, a control cage can be extracted for the specific surface. The control cage can define control points connected together so as to define a shape representative of the specific surface. The shape can be configured to change when at least one of the control points is moved in space. For example, responsive to a manipulation of at least one control point, for instance a user manipulation via a display or user interface of the computing system, the computing system can generate a new shape representative of the specific surface. The computing system can be further configured to subdivide the control cage so as to generate a subdivision representative of the specific surface of the model. In various examples, the computing system can be configured to replace the specific surface with the subdivision surface, so as to define a new model of the object. Thus, the subdivision surface of a new model can represent the new shape.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

In various embodiments described herein, subdivision surfaces are generated to represent surfaces. The surfaces can be manipulated, in accordance with embodiments described herein, using a control cage associated with the subdivision surface. By way of example, and without limitation, such surface manipulations can be particularly useful in product design workflows in which users of a CAD system, such as the CAD system 1000 (see FIG. 10), would like to introduce stylized or industrial design surfaces into the produce that is being designed.

Subdivision surfaces generally refer to generalizations of surfaces, such as bi-cubic, b-spline surfaces. In various examples described herein, arbitrary control cages, for instance any control cage, can be subdivided, and a limit surface can be computed so as to define a piecewise bi-cubic, b-spline surface. It is recognized herein that, in accordance with various embodiments, any given surface can be approximated by a piecewise bi-cubic, b-spline surface. Thus, it is further recognized herein that, in various embodiments, any surface can be represented by a subdivision surface. Such subdivision surfaces can then be manipulated so as to generate various shapes that are unable or more difficult to be generated using other surface representations. As described herein, in accordance with various embodiments, any given surface, for instance an analytic or non-analytic surface, can be represented as a subdivision surface.

Figure 1:
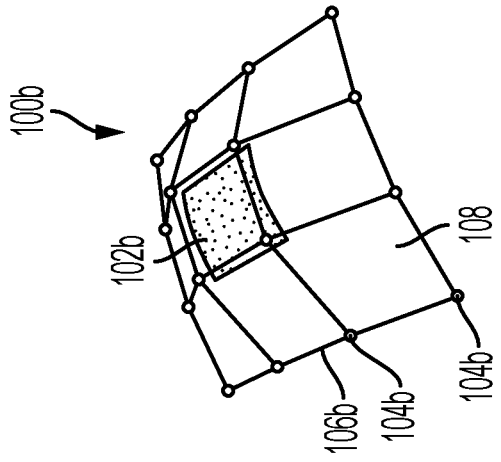
FIG. 1 depicts four models that illustrate various example surfaces.
Figure 1:
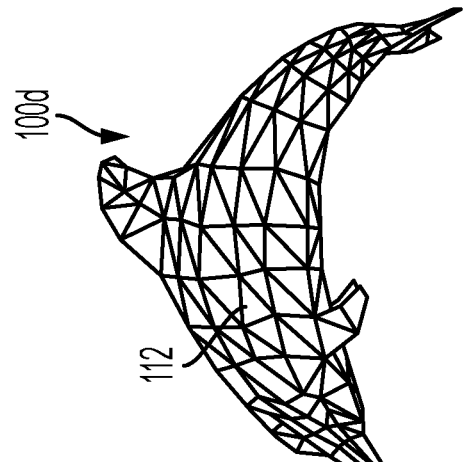
Figure 1:
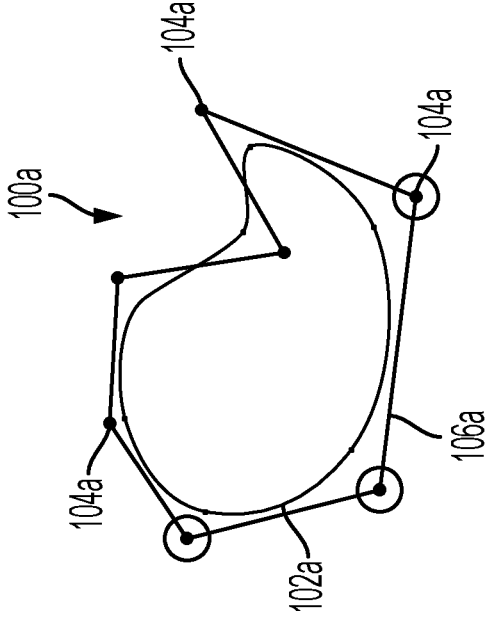
Figure 1:
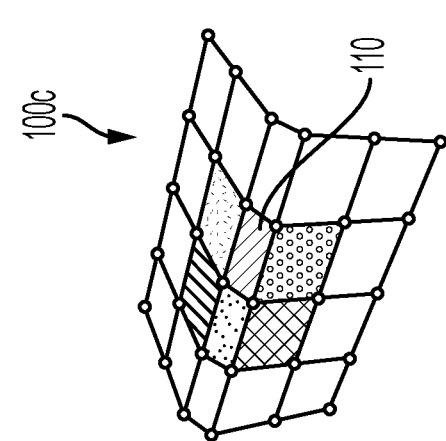

As an initial matter, a b-spline curve or surface, which can be referred to as simply a b-spline, refers to a linear combination of special types of polynomials called b-spline basis functions that include vector-valued coefficients called control points. Cubic and quadratic b-spline basis functions can be used in CAD systems because they are numerically stable. Referring to FIG. 1, example models 100*a* and 100*b* include an example b-spline curve 102*a* and a b-spline surface 102*b*, respectively, and control points 104*a* and 104*b*. A respective control hull (or cage) 106*a* and 106*b* connects the control points 104*a* and 104*b* with one another, so as to represent the b-spline curve 102*a* and b-spline surfaces 102*b*. The model 100*b* can include subdivision surfaces 108 that refer to the generalization of the b-spline surfaces 102*b* to the control cage 106*b*. In particular, subdivision surfaces can refer to piecewise parametric surfaces defined over meshes of arbitrary topology. Piecewise parametric surfaces generally represent collections of simpler modeling primitives, which can be referred to as patches. Patches can constitute the "pieces" of the larger surface in much the same way as a face or polygon constitutes a piece of a polygonal mesh. In most cases, patches refer to a uniform, bi-cubic, b-spline surface, such as the b-spline surface 102*b*. Still referring to FIG. 1, an example model 100*c* defines piecewise subdivision surface 110. Further, an example model 100*d* shows an example mesh surface 112 (or polygonal mesh) that includes polygons, for instance triangles. In various examples, any surface can be represented by a mesh surface. For example, a mesh that is finer than a coarse mesh can include more polygons (e.g., triangles) than the coarse mesh. It is recognized herein, however, that turning a surface into a mesh (e.g., triangles such as the mesh 112) and then building a control cage from the mesh can have technical limitations such as, for example, resulting in a limit surface that is different than the original surface that was approximated by the mesh.

Figure 2:
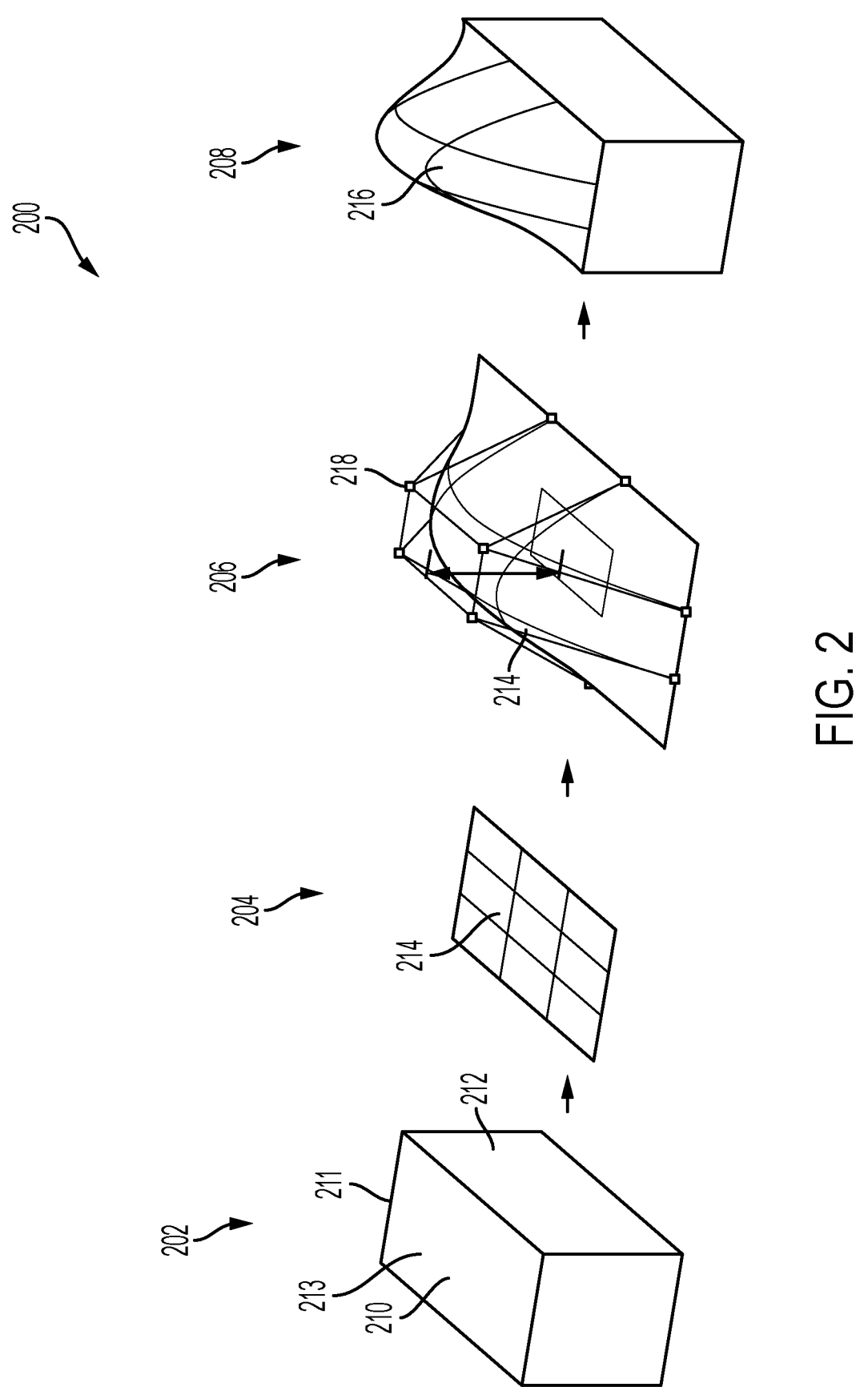
FIG. 2 is a block diagram that depicts an example of a planar surface being edited in accordance with an example embodiment.

Referring to FIG. 2, an example design flow 200 for a model is depicted in accordance with an example embodiment. A computing or CAD system, such as the CAD system 1000, can obtain a model of an object, or more generally, a solid or sheet body 212. The model or sheet body 212 can define one or more faces. At 202, a face 210 of the solid or sheet body 212 can be selected for editing. As used herein, solid and sheet body can be used interchangeably without limitation, unless otherwise specified. The example face 210 define boundaries 211 and a surface 213 within the boundaries 211. In particular, the face 210 defines a planar surface within the boundaries 211, though it will be understood that a face that is selected for editing can define additional or alternative surface shapes, and all such faces are contemplated as being within the scope of this disclosure. In some cases, a user of the CAD system 1000 locates or selects the face 210, for instance from a plurality of faces defined by the sheet body 212, for conversion into a subdivision surface 216. In an example, based on a user selection, the CAD system 1000 can determine a surface type associated with the surface 213 that is defined on the face 210, and thus associated with the face 210. Referring to FIG. 2, for example, the CAD system 1000 can determine that a planar surface is defined by the face 210. In some examples, surface types can be defined when the solid or sheet body is created and stored, such that the faces of the solid or sheet body are associated with respective surface types. Thus, in an example, the CAD system 1000 can perform a query function to obtain the surface type defined by a particular face. The CAD system 1000 can generate an approximation of the surface 213. In accordance with various embodiments, the CAD system 1000 can generate a suitable b-spline approximation of the surface 213, based on the surface type.

Still referring to FIG. 2, at 204, the CAD system 1000 can extract a control cage 214 from the approximation of the surface 213. In particular, the b-spline approximation of the surface 213, or the b-spline surface definition, can contain information from which the control cage 214 can be extracted. The control cage 214 can connect control points 218 together, so as to define a plurality of sections. The example control cage 214 defines six sections, though it will be understood that a control cage can connect any number of control points as desired so as to define an alternative number of sections, and all such control cages are contemplated as being within the scope of this disclosure. At 206, a user of the CAD system 1000 can edit the control cage 214, for example, so as to change the shape of the surface of the face 210. In some examples, the user can manipulate the control points 218 via user interface, so as to alter the control cage 214, and thus change the shape of the surface of the face 210. Further, at 208, the CAD system 1000 can subdivide the control cage so as to define a limit surface or subdivision surface 216.

Without being bound by theory, referring generally to FIG. 2, a control cage can define a coarse representation of a shape. A given control cage can be refined successively by applying certain rules to its control points, so as to arrive at next level control points. Subdivision generally refers to the process of arriving at next level points from the previous level ones by applying certain rules. Thus, each application of subdivision rules can be referred to as a level of subdivision, such that each application of subdivision rules results in a next level of control points. With each level of subdivision, the control cage can converge toward its limit surface. In theory, infinite levels of subdivision can converge to the limit surface. In practice, generally a few levels of subdivision result in a limit surface of good quality, and applying subdivision rules beyond those levels does not yield an appreciably better-quality limit surface. For example, referring to FIG. 4 further described below, a hexagonal prism defines the control cage of a cylindrical limit surface. By applying subdivision rules to its control points successively, the CAD system 1000 can generate a limit surface 410 that looks like a cylinder.

In some cases, the limit or subdivision surface 216 can be trimmed against the boundaries 211 of the face 210 that defines the original surface 213, so as to contain the subdivision surface 216 within the boundaries 211. At 208, the surface 213 can be replaced by the subdivision surface 216. Thus, the solid/sheet body 212 can be integrated with the subdivision surface 216, such that the face 210 defines the subdivision surface 216 within the boundaries 211. The subdivision surface 216 and/or the solid/sheet body 212, in some cases, can be further edited or processed. Alternatively, or additionally, the subdivision surface 216 can be further edited or processed independently from the solid/sheet body 212.

Figure 3:
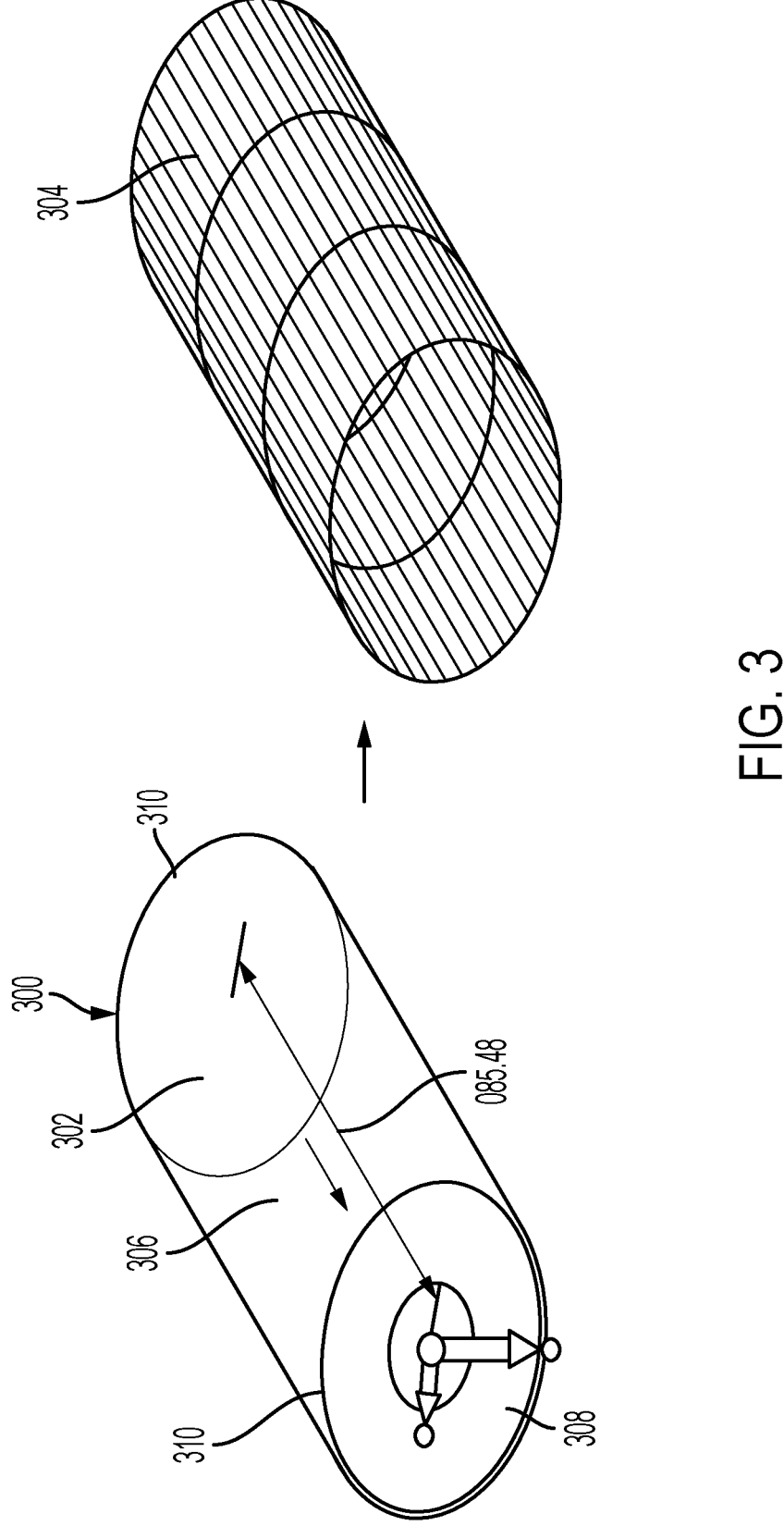
FIG. 3 shows an example cylindrical surface that can modeled in accordance with embodiments described herein.

As described above, the CAD system 1000 can generate a b-spline approximation of a surface, based on the surface type, and the CAD system 1000 can extract a control cage from the approximation of the surface. Referring to FIG. 3 a cylindrical surface 302 is directly converted to a b-spline approximation, which, it is recognized herein, results in a control cage 304, in particular a dense control cage 304. FIG. 3 shows an example solid 300, which includes a face 306 that defines the cylindrical surface 302. The face 306, and thus the solid 300, further defines a cross-section 308. The face 306 can further define boundaries 310 that define ends or bounded limits of the cylindrical surface 302. In particular the cross-section 308 defines circle, though it will be understood that cross-sections of faces may define additional or alternative shapes, and all such additional or alternative shapes are contemplated as being within the scope of this disclosure. It is further recognized herein, as described herein, that the CAD system 1000 can generate a cross-section b-spline approximation of the cross-section 308, and can extract a control cage 400 (see FIG. 4) from the cross-section b-spline approximate that is more coarse as compared to the control cage 304 that is extracted from the b-spline approximation of the cylindrical surface 302.

Figure 4:
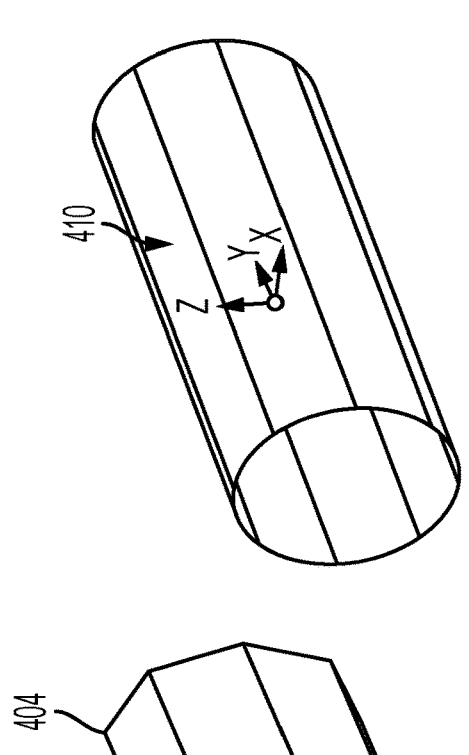
FIG. 4 shows example models associated with the cylindrical surface illustrated in FIG. 3, in accordance with an example embodiment.
Figure 4:
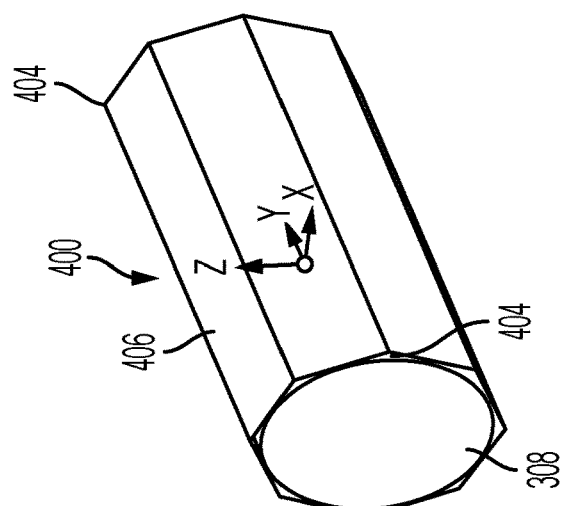
Figure 4:
Figure 4:
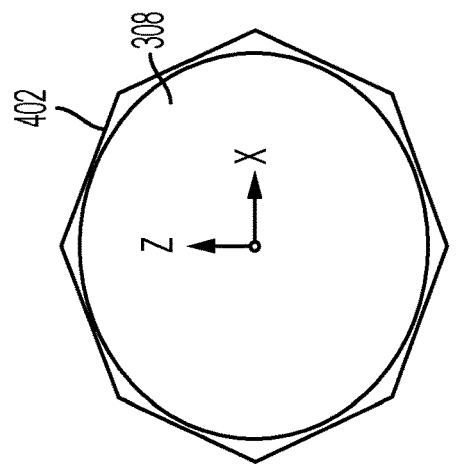

In particular, referring also to FIG. 4, a b-spline curve approximation of the cross-section 308 can be generated, from which a first control cage 402 can be generated. Thus, the first control cage 402 can be generated for the cross-section 308. In an example, a tolerance can be varied so as to vary the fit between the b-spline curve to the circle, so as extract the control cage 400 that can be coarser as compared to a control cage (e.g., control cage 304) that is otherwise extracted. Tolerance generally refers to a distance measure between the geometric entity being approximated and the approximation itself. For example, two points in space are said to coincide within a tolerance of one hundred millionth of a meter if the distance between them is one hundred millionth of a meter. Thus, an approximation can accepted as a replacement to the original to a given tolerance. With respect to the example illustrated in FIGS. 3 and 4, the cross-section circle 308 is the geometric entity being approximated by a b-spline curve. Because approximations are to a given tolerance, the distance measure that defines the tolerance can be varied by the CAD system so as to obtain varying degrees of b-spline curve approximations to the circle 308. The tighter the tolerance, the more precise the b-spline approximation will be to the circle. The looser the tolerance, the less precise (or coarse) the b-spline approximation will be to the circle. In some cases, for control cage extraction purposes, a coarser b-spline approximation suffices. Further, by subdividing the extracted control cage to different levels of subdivision, the CAD system can generate a subdivision surface to varying levels of approximation to the original surface (e.g., the cylinder in FIG. 4). In some examples, the different levels of subdivision can imply a varying distance measure or tolerance between the original surface and its approximation.

The CAD system 1000 can sweep the first control cage 402 for the circular cross-section 308, so as to generate the control cage 400 for the face 306. Sweeping can refer to generating a surface by translating a given cross-section along a given path, and connecting those cross-sections smooth to generate a surface. For example, the circle's control cage 402 can be swept along a longitudinal axis of defined by the solid 300 between the bounded limits of the surface 302 to obtain the control cage 400 (or solid/sheet control cage body) for the source surface 302. The control cage 400 can connect control points 404 together, so as to define a plurality of sections 406. The example control cage 400 defines eight sections 406, though it will be understood that a control cage can connect any number of control points as desired so as to define an alternative number of sections, and all such control cages are contemplated as being within the scope of this disclosure. A user of the CAD system 1000 can edit the control cage 400, for example, so as to change the shape of the surface of the face 306. In some examples, the user can manipulate the control points 404 via a user interface, so as to alter the control cage 400, and thus change the shape of the surface of the face 306. Further, the CAD system 1000 can subdivide the control cage 400 so as to define a limit surface or subdivision surface 410 that is a close approximation of the original cylindrical surface 302.

Though the example described above with references to FIGS. 3 and 4 generates a coarse control cage for a cylindrical surface, it will be understood that coarse control cages can be generated for other surface types as desired, such that high fidelity subdivision surfaces can ultimately be generated to replace various surface types defining various shapes.

Figure 5:
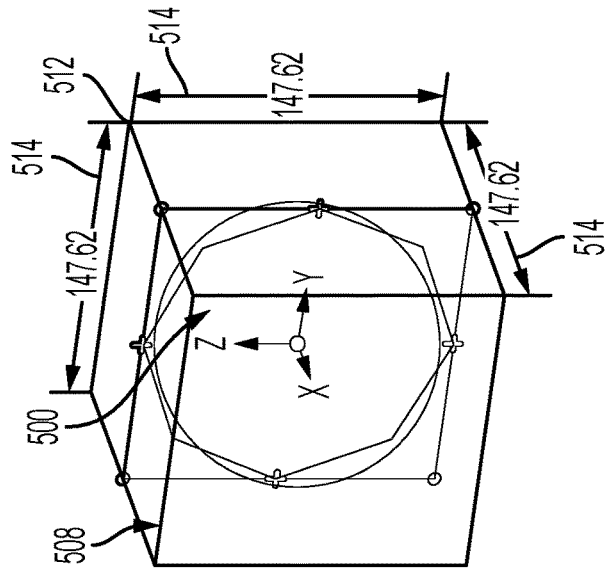
FIG. 5 illustrates example control cages that can be generated for a sphere in accordance with an example embodiment.
Figure 5:
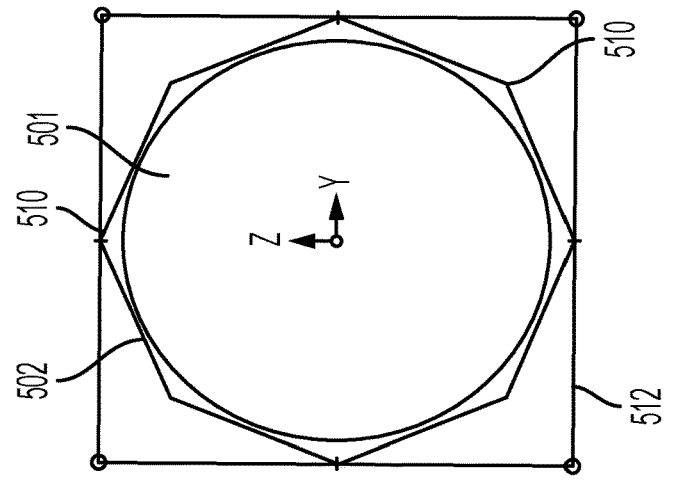
Figure 5:
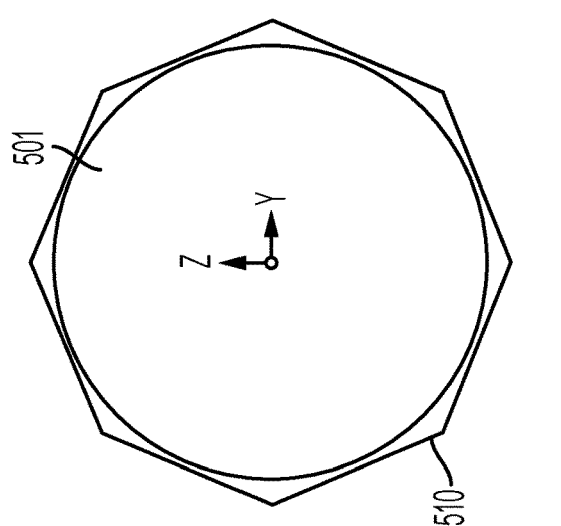

For example, referring to FIG. 5, a coarse control cage 508 can be generated for a sphere 500. In an example, a circular cross-section 501 of the sphere 500 at the center of the sphere 500 can be identified, such that the center of the circular cross-section 501 and the center of the sphere 500 are the same. The circular cross-section 501 can further define a boundary 506 that defines a diameter that is the same diameter as the diameter defined by the original sphere 500. The CAD system 1000 can generate a first control cage 502 for the circular cross-section 501 of the sphere. The example first control cage 502 includes eight control points 510 equidistantly spaced from each other, such that the first control cage 502 defines a octagon, though it will be understood that control cages of cross-sections can be alternatively shaped as desired, and all such control cages are contemplated as being within the scope of this disclosure. Based on the first control cage 502, the CAD system 1000 can further generate a bounding area 512, such that the first control cage 502 is disposed within the bounding area 512, and multiple vertices 510 of the first control cage 502 intersect the bounding area. In the example, the bounding area 512 defines a bounding square that surrounds the first control cage 502 and defines four sides that each intersect a respective vertex 510, though it will be understood that the bounding area can define alternative shapes as desired, and such bounding areas are contemplated as being within the scope of this disclosure.

The bounding area of a planar geometric entity can refer to the minimum sized square or rectangular area that completely encloses the geometric entity. For example, with respect to a circle, the bounding area can define a square having sides equal in length to the diameter of the circle. Bounding areas can be extended to 3-dimensional geometric entities as well. The CAD system 1000 can include tools or modules for computing the bounding areas of various geometric entities, such as planar and non-planar geometric entities. By way of example, for an example sphere, the coarsest control cage is a cube and the CAD system 1000 can generate the cube from a square bounding area of the cross-section circle of a sphere, as shown. In particular, for example, the CAD system 1000 can sweep the bounding area 512 across the diameter of the sphere 500, so as to generate the coarse control cage 508 that contains the sphere. In an example, the coarse control cage 508 of the sphere 500 defines a cube. The cube can include vertices 512, wherein a distance 514 between adjacent vertices 512 can be substantially equal to the diameter defined by the sphere 500.

A user of the CAD system 1000 can edit the coarse control cage 508, for example, so as to change the shape of the surface defined by the sphere 500, and thus to change the sphere 500. Further, the CAD system 1000 can subdivide the control cage 508 so as to define a limit surface or that is a close approximation of the original sphere 500.

Figure 6:
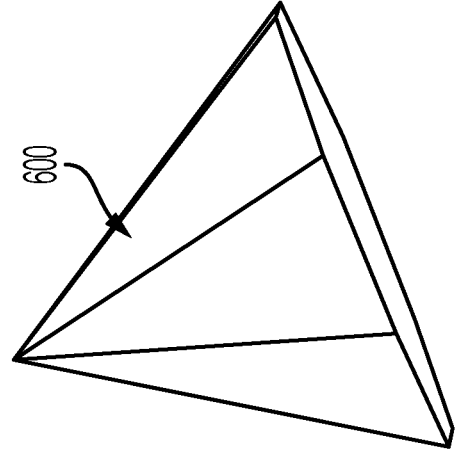
FIG. 6 illustrates an example control cage that can be generated for a cone accordance with an embodiment.
Figure 6:
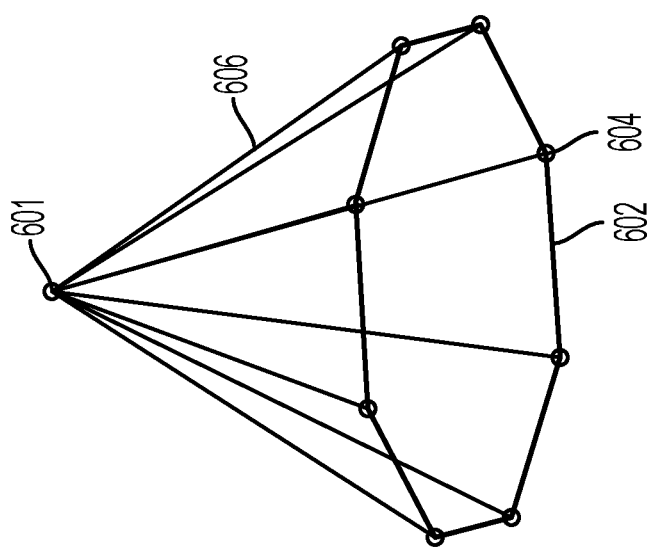

Referring to FIG. 6, in accordance with another example, a coarse control cage 600 can be generated for a cone that defines an apex 601 opposite a base shaped as a circle. Thus, the circular base can define a cross section of the cone. A b-spline curve approximation of the cross-section of the cone, in particular the base of the cone, can be generated, from which a first control cage 602 can be generated. Thus, the first control cage 602 can be generated for the base of the cone. The example first control cage 602 includes eight control points or vertices 604 equidistantly spaced from each other, such that the first control cage 602 defines an octagon, though it will be understood that control cages of circular cross-sections can be alternatively shaped as desired, and all such control cages are contemplated as being within the scope of this disclosure. Based on the first control cage 602, the CAD system 1000 can further generate a bounding area 606, such that the original cone can be disposed within the bounding area 606. In particular, each of the vertices 604 can be connected to the apex 601, so as to define the bounding area 606. The CAD system 1000 can sweep the bounding area 604 from the first control cage 602 to the apex so as to generate the control cage 600. In an example, the control cage 600 of the cone defines a cone having a base shaped as an octagon. The control cage 600 can define distance between its apex and its base that substantially is equal to the distance defined by the original cone from its apex to its base.

A user of the CAD system 1000 can edit the control cage 600, for example, so as to change the shape of the surface defined by the original cone, and thus to change the cone. Further, the CAD system 1000 can subdivide the control cage 600 so as to define a limit or subdivision surface that is a close approximation to the original cone.

Figure 7:
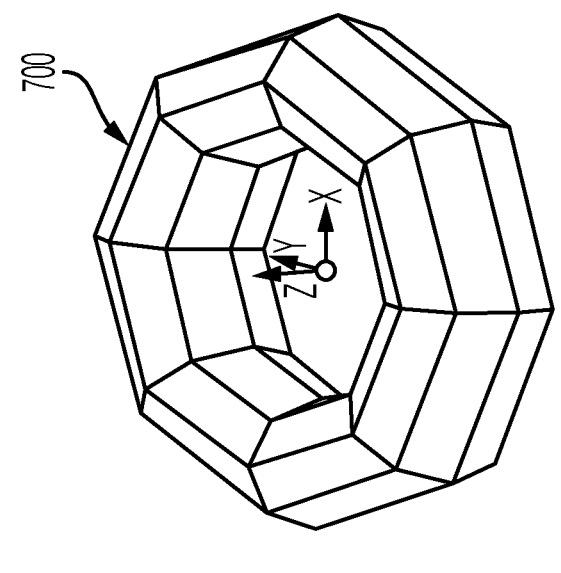
FIG. 7 illustrates example control cages that can be generated for a torus in accordance with an example embodiment.
Figure 7:
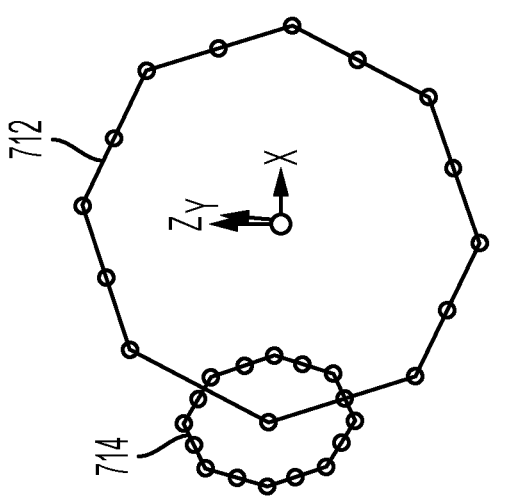
Figure 7:
Figure 7:
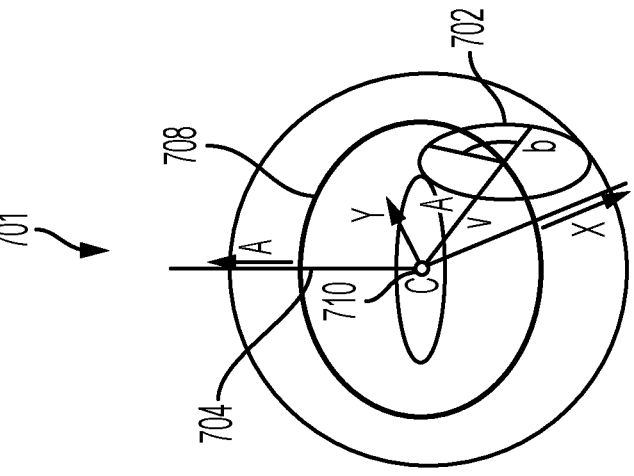

Referring now to FIG. 7, in accordance with another example, a control cage 700 for a torus can be generated. FIG. 7 shows an analytical representation 701 of an example torus. In particular, the example torus defines a surface of revolution generated by revolving a circle 702 in three-dimensional space about an axis 704, as to define a spine 708 that defines a center 710 of the torus. The axis 704 intersects the center 710. One or more b-spline curve approximations of the torus can be generated so as to generate one or more control cages associated with the torus. In particular, a first or spine control cage 712 can be generated, and a second or cross-section control cage 714 can be generated. The spine control cage 712 can be generated so as to surround the spine 708. The example spine control cage 712 includes eight control points or vertices equidistantly spaced from each other, such that the spine control cage 712 defines an octagon, though it will be understood that spine control cages can be alternatively shaped as desired, and all such control cages are contemplated as being within the scope of this disclosure. Further, the cross-section control cage 714 can be generated so as to surround a circular cross-section of the torus, wherein the spine 708 defines the center of the circular cross-section. Thus, the spine 708 can define the center of the cross-section control cage 714. The example cross-section control cage 714 includes eight control points or vertices equidistantly spaced from each other, such that the cross-section control cage 714 defines an octagon, though it will be understood that control cages for cross-sections of toruses can be alternatively shaped as desired, and all such control cages are contemplated as being within the scope of this disclosure.

Based on the first and second control cages 712 and 714, respectively, the CAD system 1000 can further sweep the cross-section control cage 714 along the spine control cage 712, so as to generate the control cage 700. A user of the CAD system 1000 can edit the control cage 700, for example, so as to change the shape of the surface defined by the original torus, and thus to change the torus.

Figure 8:
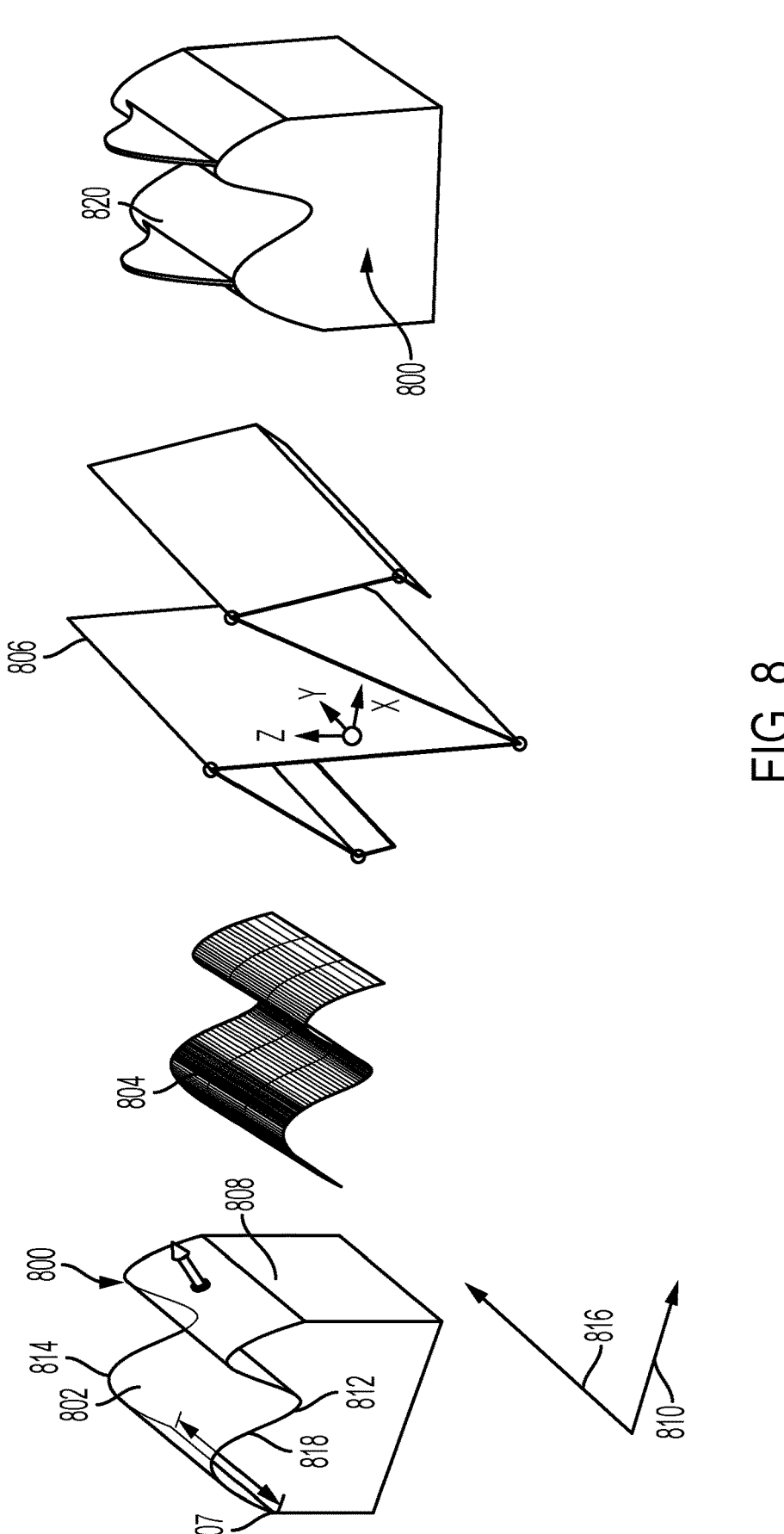
FIG. 8 illustrates example models that can generated for a swept surface in accordance with an example embodiment.

Referring now to FIG. 8, a piecewise b-spline surface can also be edited in accordance with various embodiments. By way of example, the CAD system 1000 can obtain a solid or sheet body 800 that includes a swept surface 802 that is selected for editing. It is recognized herein that a dense control cage 804 can be extracted from the swept surface

802 by approximating the surface 802 with a piecewise b-spline surface. It is further recognized herein that a control cage 806 can be generated according to various embodiments that is less dense than the dense control cage 804, and is at least as a close approximation to the original swept surface 802 as the dense control cage 804 is.

In an example, based on a user selection, the CAD system 1000 can determine a surface type associated with the surface 802. In particular, the CAD system can determine that the surface 802 is a swept surface. The swept surface 802 can define a first end 807 and a second end 808 that is opposite the first end 807 along a lateral direction 810. The surface 802 can further define a third end 812 and a fourth end 814 that is opposite the third end 812 along a longitudinal direction 816 that is substantially perpendicular to the lateral direction 810. For example, a cross-section curve 818 of the swept surface 802 can be defined at the first end 807. The cross-section curve 818 can further define the curve from the third end 812 to the fourth end 814. The CAD system 1000 can extract a curve control cage for the cross-section curve 818, and can sweep the curve control cage along the longitudinal direction 816 so as to generate the control cage 806. In particular, for example, the CAD system 1000 can sweep the control cage for the cross-section curve 818 from the third end 812 to the fourth end 814, so as to generate the control cage 806 that approximates the original swept surface 802.

It will be understood that FIG. 8 is presented as an example, and alternative shaped surfaces can be swept in accordance with various embodiments described herein. For example, spun surfaces can be approximated by sweeping a cross-section curve about an axis, so as generate a control cage for a spun or rounded surface. Thus, swept surfaces can define various shapes, and all such swept surface shapes are contemplated as being within the scope of this disclosure.

A user of the CAD system 1000 can edit the control cage 806, for example, so as to change the shape of the swept surface 802. Further, the CAD system 1000 can subdivide the control cage so as to define a limit surface or subdivision surface 820, which can replace the original swept surface 802. Thus, the solid/sheet body 800 can be integrated with the subdivision surface 820. The subdivision surface 820 and/or the solid/sheet body 800, in some cases, can be further edited or processed. Alternatively, or additionally, the subdivision surface 818 can be further edited or processed independently from the sheet body 800.

In an example in which an original or source surface is a b-spline surface and its degree in U-parameter cubic, the associated control cage can be extracted from the b-spline surface definition. Alternatively, in accordance with various embodiments described herein, an original surface can be approximated with piecewise bi-cubic, b-spline surfaces, from which the control cage can be extracted. With respect to given mesh surface, in an example, a piecewise b-spline surface can be constructed that closely approximates the original mesh surface. A control cage can be extracted from the b-spline surface, and the control cage can be used for subdivision. Example mesh surfaces (or polygonal surface mesh) include polygons, for instance triangles. In various examples, any surface can be represented by various mesh surfaces, wherein the granularity of a mesh surface increases as the number of polygons defined by the mesh surfaces increases. By way of example, a fine mesh surface that represents a given original surface can include more polygons than a comparatively coarse mesh surface that represents the same original surface.

Figure 9:
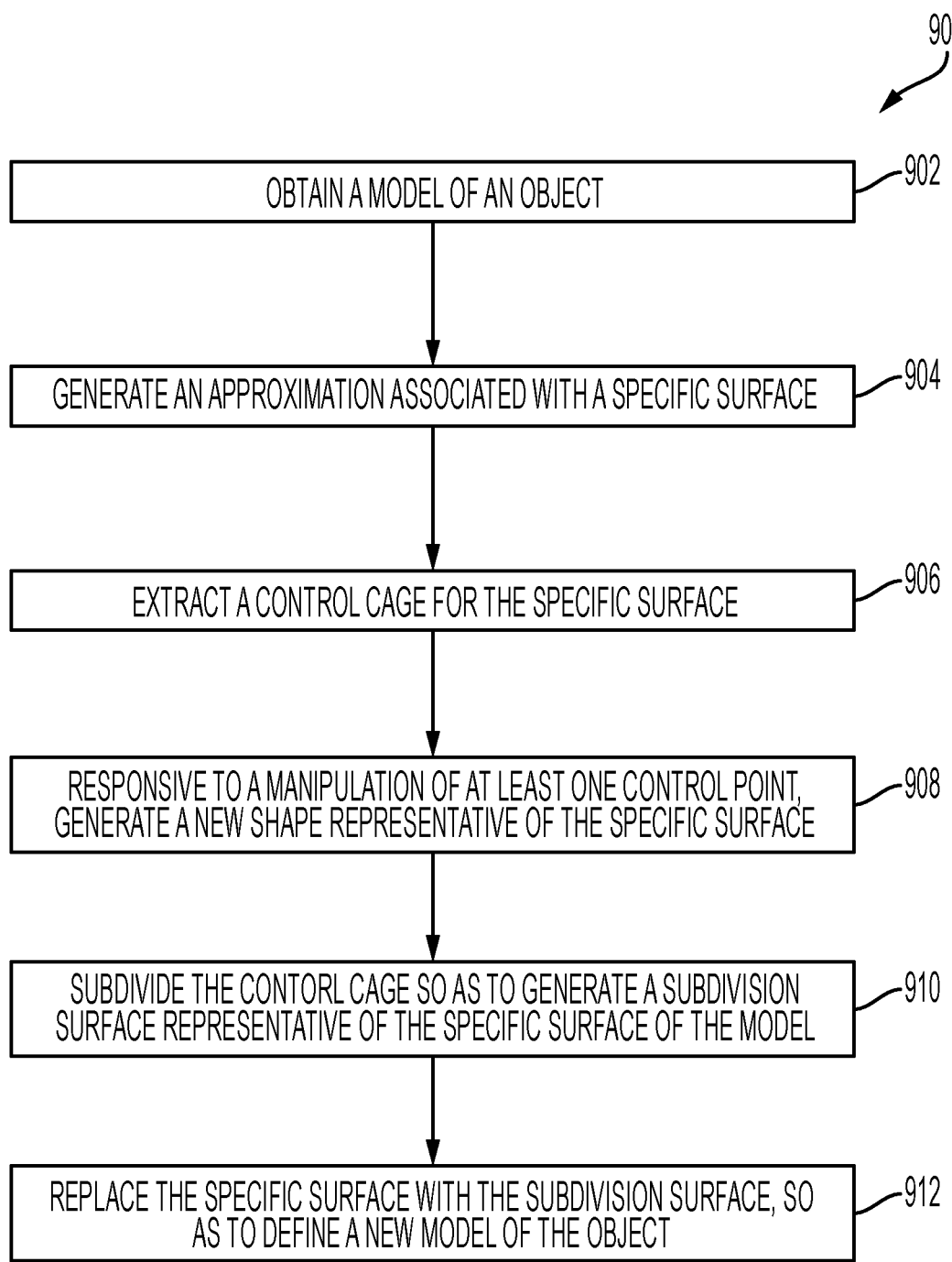
FIG. 9 is a flow diagram that shows example operations that can be performed to model a surface in accordance with an example embodiment.

Referring to FIG. 9, a computing system, for instance the CAD system 1000, can be configured to perform example operations 900. At 902, the computing system can be configured to obtain or display a model of an object. The model can define one or more faces having one or more surfaces. At 904, the computing system can be further configured to generate an approximation, for instance a b-spline approximation, associated with a specific surface of the model or one or more surfaces. At 906, based on the approximation, a control cage can be extracted for the specific surface. The control cage can define control points connected together so as to define a shape representative of the specific surface. The shape can be configured to change when at least one of the control points is moved in space. In some cases, for instance before generating the b-spline approximation, the CAD system 1000 can determine that the specific surface has a surface type that is valid. For example, the CAD system 1000 can store the surface type of the surface each face with the corresponding model. Further, the surface types can be queried so as to check whether a given surface type is a plane, cylinder, sphere, cone, torus, mesh, revolved/spun, mesh, or b-spline, and thus is valid. When the surface type is valid, the CAD system 1000 can generate the b-spline approximation based on the surface type of the specific surface.

In some examples, referring also to FIGS. 4, 6, and 7, extracting the control cage for the specific surface can include generating a cross-section control cage for a cross-section shape that is defined by a cross-section of the specific surface. In various examples, the cross-section cage can be swept from a first end of the specific surface to a second end of the specific surface that is opposite the first end of the specific surface. For example, referring in particular to FIG. 4, the cross-section shape can define dimensions in a first direction and a second direction that is substantially perpendicular to the first direction, and the CAD system 1000 can sweep the cross-section control cage along a third direction that is substantially perpendicular to the both the first and second directions. Alternatively, or additionally, the CAD system 1000 can sweep the cross-section control cage about an axis that is substantially perpendicular to a direction along which the first and second ends of the specific surface are spaced apart from each other. In yet another example, referring to FIG. 5, extracting the control cage can include generating a cross-section control cage for a cross section shape that is defined by a cross-section of the specific surface, wherein the cross-section control cage defines a plurality of vertices. The CAD system 1000 can construct a bounding area around the cross section of the specific surface, such that the bounding area intersects at least one of the plurality of vertices of the cross-section control cage. The CAD system 1000 can further be configured to sweep the bounding area from a first end of the specific surface to a second end of the specific surface that is opposite the first end of the specific surface.

Still referring to FIG. 9, at 908, responsive to a manipulation of at least one control point, for instance a user manipulation via a display or user interface of the computing system, the computing system can generate a new shape representative of the specific surface. AT 910, the computing system can be further configured to subdivide the control cage so to generate a subdivision representative of the specific surface of the model. In various examples, at 912, the computing system can be configured to replace the specific surface with the subdivision surface, so as to define a new model of the object. Thus, the subdivision surface of a new model can represent the new shape. In some cases, the subdivision surface and/or model can be further processed or revised. Additionally, or alternatively, the CAD system 1000 can convert the new model into machine-executable instructions. The instructions can be executed by a 3D printer to print the object represented by the new model having the subdivision surface.

Figure 10:
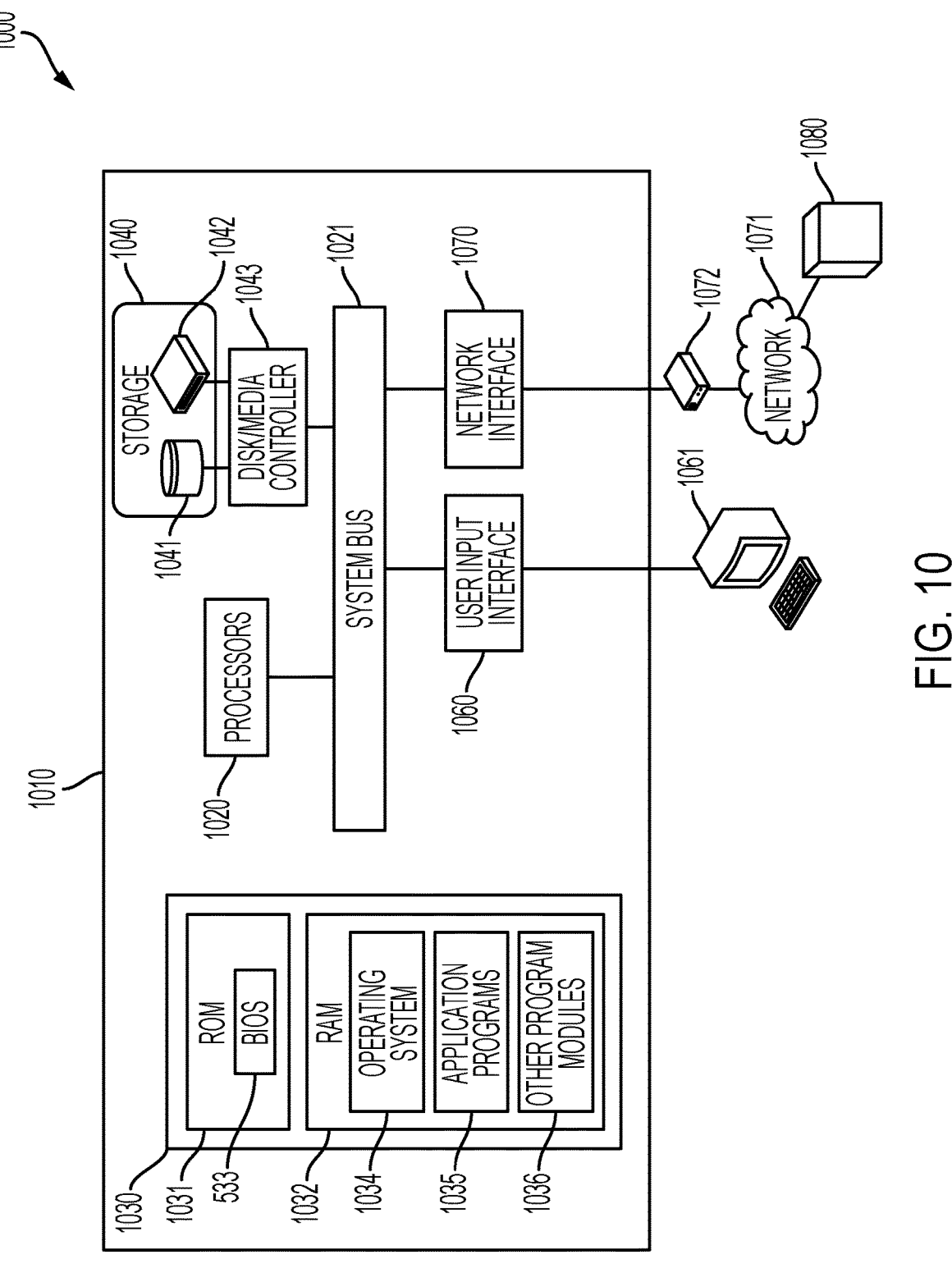
FIG. 10 shows an example of a computing environment or CAD system within which embodiments of the disclosure may be implemented.

FIG. 10 illustrates an example of a computing environment within which embodiments of the present disclosure may be implemented. A computing environment or CAD system 1000 includes a computer system 1010 that may include a communication mechanism such as a system bus 1021 or other communication mechanism for communicating information within the computer system 1010. The computer system 1010 further includes one or more processors 1020 coupled with the system bus 1021 for processing the information.

The processors 1020 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1020 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 1021 may include at least one of a system bus, a memory bus, an address bus, or a message bus, and may permit exchange of information (e.g., data (including computer-executable code), signaling, etc.) between various components of the computer system 1010. The system bus 1021 may include, without limitation, a memory bus or a memory controller, a peripheral bus, an accelerated graphics port, and so forth. The system bus 1021 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 10, the computer system 1010, and thus the CAD system 1000 may also include a system memory 1030 coupled to the system bus 1021 for storing information and instructions to be executed by processors 1020. The system memory 1030 may include computer readable storage media in the form of volatile and/or nonvolatile memory, such as read only memory (ROM) 1031 and/or random access memory (RAM) 1032. The RAM 1032 may include other dynamic storage device(s) (e.g., dynamic RAM, static RAM, and synchronous DRAM). The ROM 1031 may include other static storage device(s) (e.g., programmable ROM, erasable PROM, and electrically erasable PROM). In addition, the system memory 1030 may be used for storing temporary variables or other intermediate information during the execution of instructions by the processors 1020. A basic input/output system 1033 (BIOS) containing the basic routines that help to transfer information between elements within computer system 1010, such as during start-up, may be stored in the ROM 1031. RAM 1032 may contain data and/or program modules that are immediately accessible to and/or presently being operated on by the processors 1020. System memory 1030 may additionally include, for example, operating system 1034, application programs 1035, and other program modules 1036. Application programs 1035 may also include a user portal for development of the application program, allowing input parameters to be entered and modified as necessary.

The operating system 1034 may be loaded into the memory 1030 and may provide an interface between other application software executing on the computer system 1010 and hardware resources of the computer system 11010. More specifically, the operating system 1034 may include a set of computer-executable instructions for managing hardware resources of the computer system 1010 and for providing common services to other application programs (e.g., managing memory allocation among various application programs). In certain example embodiments, the operating system 1034 may control execution of one or more of the program modules depicted as being stored in the data storage 1040. The operating system 1034 may include any operating system now known or which may be developed in the future including, but not limited to, any server operating system, any mainframe operating system, or any other proprietary or non-proprietary operating system.

The computer system 1010 may also include a disk/media controller 1043 coupled to the system bus 1021 to control one or more storage devices for storing information and instructions, such as a magnetic hard disk 1041 and/or a removable media drive 1042 (e.g., floppy disk drive, compact disc drive, tape drive, flash drive, and/or solid state drive). Storage devices 1040 may be added to the computer system 1010 using an appropriate device interface (e.g., a small computer system interface (SCSI), integrated device electronics (IDE), Universal Serial Bus (USB), or FireWire). Storage devices 1041, 1042 may be external to the computer system 1010.

The computer system 1010 may also include a field device interface 1065 coupled to the system bus 1021 to control a field device 1066, such as a device used in a production line. The computer system 1010 may include a user input interface or GUI 1061, which may comprise one or more input devices, such as a keyboard, touchscreen, tablet and/or a pointing device, for interacting with a computer user and providing information to the processors 1020.

The computer system 1010 may perform a portion or all of the processing steps of embodiments of the invention in response to the processors 1020 executing one or more sequences of one or more instructions contained in a memory, such as the system memory 1030. Such instructions may be read into the system memory 1030 from another computer readable medium of storage 1040, such as the magnetic hard disk 1041 or the removable media drive 1042. The magnetic hard disk 1041 and/or removable media drive 1042 may contain one or more data stores and data files used by embodiments of the present disclosure. The data store 1040 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 1020 may also be employed in a multi-processing arrangement to execute the one or more sequences of instructions contained in system memory 1030. In alternative embodiments, hardwired circuitry may be used in place of or in combination with software instructions. Thus, embodiments are not limited to any specific combination of hardware circuitry and software.

As stated above, the computer system 1010 may include at least one computer readable medium or memory for holding instructions programmed according to embodiments of the invention and for containing data structures, tables, records, or other data described herein. The term "computer readable medium" as used herein refers to any medium that participates in providing instructions to the processors 1020 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 1041 or removable media drive 1042. Non-limiting examples of volatile media include dynamic memory, such as system memory 1030. Non-limiting examples of transmission media include coaxial cables, copper wire, and fiber optics, including the wires that make up the system bus 1021. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment or CAD system 1000 may further include the computer system 1010 operating in a networked environment using logical connections to one or more remote computers, such as remote computing device 1080. The network interface 1070 may enable communication, for example, with other remote devices 1080 or systems and/or the storage devices 1041, 1042 via the network 1071. Remote computing device 1080 may be a personal computer (laptop or desktop), a mobile device, a server, a router, a network PC, a peer device or other common network node, and typically includes many or all of the elements described above relative to computer system 1010. When used in a networking environment, computer system 1010 may include modem 1072 for establishing communications over a network 1071, such as the Internet. Modem 1072 may be connected to system bus 1021 via user network interface 1070, or via another appropriate mechanism.

Network 1071 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1010 and other computers (e.g., remote computing device 1080). The network 1071 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1071.

It should be appreciated that the program modules, applications, computer-executable instructions, code, or the like depicted in FIG. 10 as being stored in the system memory 1030 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 1010, the remote device 1080, and/or hosted on other computing device(s) accessible via one or more of the network(s) 1071, may be provided to support functionality provided by the program modules, applications, or computer-executable code described herein.

It should further be appreciated that the computer system 1010 may include alternate and/or additional hardware, software, or firmware components beyond those described or depicted without departing from the scope of the disclosure. More particularly, it should be appreciated that software, firmware, or hardware components depicted as forming part of the computer system 1010 are merely illustrative and that some components may not be present or additional components may be provided in various embodiments. While various illustrative program modules have been depicted and described as software modules stored in system memory 1030, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
obtaining a model of an object, the model defining one or more surfaces;
generating a b-spline approximation associated with a specific surface of the one or more surfaces, the b-spline approximation defining a uniform bi-cubic, b-spline approximation;
based on the b-spline approximation, extracting a control cage for the specific surface, the control cage defining control points connected together so as to define a shape representative of the specific surface, the shape configured to change when at least one of the control points is moved in space;
subdividing the control cage so as to generate a subdivision surface representative of the specific surface of the model;
before generating the b-spline approximation, determining that the specific surface has a surface type that defines a plane, cylinder, sphere, cone, torus, mesh, or b-spline; and
when the surface type defines the plane, cylinder, sphere, cone, torus, mesh, or b-spline, generating the uniform bi-cubic, b-spline approximation based on the surface type of the specific surface.

2. The method of claim 1, the method further comprising:
replacing the specific surface with the subdivision surface, so as to define a new model of the object, the new model comprising the subdivision surface.

3. The method of claim 2, the method further comprising:
responsive to a manipulation of at least one control point, generating a new shape representative of the specific surface, wherein the subdivision surface of the new model represents the new shape.

4. The method further of claim 3, the method further comprising:
converting the new model into machine-executable instructions; and executing the instructions by a 3D printer, wherein executing the instructions comprises:
printing the object represented by the new model having the subdivision surface.

5. The method of claim 1, wherein extracting the control cage for the specific surface further comprises:
generating a cross-section control cage for a cross-section shape that is defined by a cross-section of the specific surface; and
sweeping the cross-section control cage from a first end of the specific surface to a second end of the specific surface that is opposite the first end of the specific surface.

6. The method of claim 5, wherein the cross-section shape defines dimensions in a first direction and a second direction that is substantially perpendicular to the first direction, and the sweeping of the cross-section control cage further comprises sweeping the cross-section control cage along a third direction that is substantially perpendicular to both the first and second directions.

7. The method of claim 5, wherein sweeping the cross-section control cage further comprises sweeping the cross-section control cage about an axis that is substantially perpendicular to a direction along which the first and second ends of the specific surface are spaced apart from each other.

8. The method of claim 1, wherein extracting the control cage for the specific surface further comprises:
generating a cross-section control cage for a cross section shape that is defined by a cross-section of the specific surface, the cross-section control cage defining a plurality of vertices;
based on the surface type of the specific surface, constructing a bounding area around the cross section of the specific surface, the bounding area intersecting at least one of the plurality of vertices of the cross-section control cage; and
sweeping the bounding area from a first end of the specific surface to a second end of the specific surface that is opposite the first end of the specific surface.

9. The method of claim 1, wherein a face of the model includes the specific surface, the face further defining boundaries that surround the specific surface, the method further comprising:
trimming the subdivision surface such that the boundaries defined by the face contain the subdivision surface.

10. A computing system comprising:
a processor; and
a memory storing instructions that, when executed by the processor, configure the system to:
obtain a model of an object, the model defining one or more surfaces;
generate a b-spline approximation associated with a specific surface of the one or more surfaces, the b-spline approximation defining a uniform bi-cubic, b-spline approximation;
based on the b-spline approximation, extract a control cage for the specific surface, the control cage defining control points connected together so as to define a shape representative of the specific surface, the shape configured to change when at least one of the control points is moved in space;
subdivide the control cage so as to generate a subdivision surface representative of the specific surface of the model;

before generating the b-spline approximation, determine that the specific surface has a surface type that defines a plane, cylinder, sphere, cone, torus, mesh, or b-spline; and when the surface type defines the plane, cylinder, sphere, cone, torus, mesh, or b-spline, generate the uniform bi-cubic, b-spline approximation based on the surface type of the specific surface.

11. The computing system of claim 10, the memory further storing instructions that further configure the system to:

replace the specific surface with the subdivision surface, so as to define a new model of the object, the new model comprising the subdivision surface.

12. The computing system of claim 11, the memory further storing instructions that further configure the system to:

responsive to a manipulation of at least one control point, generate a new shape representative of the specific surface, wherein the subdivision surface of the new model represents the new shape.

13. The computing system of claim 10, the memory further storing instructions that further configure the system to:

generate a cross-section control cage for a cross-section shape that is defined by a cross-section of the specific surface; and sweep the cross-section control cage from a first end of the specific surface to a second end of the specific surface that is opposite the first end of the specific surface.

14. The computing system of claim 13, wherein the cross-section shape defines dimensions in a first direction and a second direction that is substantially perpendicular to the first direction, the memory further storing instructions that further configure the system to:

sweep the cross-section control cage along a third direction that is substantially perpendicular to both the first and second directions.

15. The computing system of claim 13, the memory further storing instructions that further configure the system to:

sweep the cross-section control cage about an axis that is substantially perpendicular to a direction along which the first and second ends of the specific surface are spaced apart from each other.

16. The computing system of claim 10, the memory further storing instructions that further configure the system to:

generate a cross-section control cage for a cross section shape that is defined by a cross-section of the specific surface, the cross-section control cage defining a plurality of vertices;

based on a surface type of the specific surface, construct a bounding area around the cross section of the specific surface, the bounding area intersecting at least one of the plurality of vertices of the cross-section control cage; and sweep the bounding area from a first end of the specific surface to a second end of the specific surface that is opposite the first end of the specific surface.

17. The computing system of claim 10, wherein a face of the model includes the specific surface, the face further defining boundaries that surround the specific surface, the memory further storing instructions that further configure the system to:

trim the subdivision surface such that the boundaries defined by the face contain the subdivision surface.

18. A non-transitory computer-readable storage medium, the computer-readable storage medium including instructions that when executed by a computer, cause the computer to:

obtain a model of an object, the model defining one or more surfaces;

generate a uniform, bi-cubic, b-spline approximation associated with a specific surface of the one or more surfaces;

based on the uniform, bi-cubic, b-spline approximation, extract a control cage for the specific surface, the control cage defining control points connected together so as to define a shape representative of the specific surface, the shape configured to change when at least one of the control points is moved in space;

subdivide the control cage so as to generate a subdivision surface representative of the specific surface of the model;

before generating the b-spline approximation, determine that the specific surface has a surface type that defines a plane, cylinder, sphere, cone, torus, mesh, or b-spline; and when the surface type defines the plane, cylinder, sphere, cone, torus, mesh, or b-spline, generate the uniform bi-cubic, b-spline approximation based on the surface type of the specific surface.

* * * * *